United States Patent

Inoue

[15] 3,649,898
[45] Mar. 14, 1972

[54] WINDSHIELD WIPER CONTROL APPARATUS

[72] Inventor: Goro Inoue, Hamamatsu-shi, Japan

[73] Assignee: Nippon Denso Kabushiki Kaisha, Kariya-shi, Japan

[22] Filed: Aug. 19, 1969

[21] Appl. No.: 851,311

[30] Foreign Application Priority Data

Sept. 25, 1968 Japan..................................43/69259
Nov. 27, 1968 Japan..................................43/87230
Sept. 21, 1968 Japan..................................43/65880

[52] U.S. Cl...........................318/483, 318/443, 15/250.12
[51] Int. Cl.......................................................H02p 3/00
[58] Field of Search...........318/483, 443; 15/250.02, 250.12

[56] References Cited

UNITED STATES PATENTS 2,407,215  9/1946  Anderson............................318/483 X
3,458,889  8/1969  Tann....................................15/250.12
3,555,289  1/1971  Sobkow..............................318/483 X

FOREIGN PATENTS OR APPLICATIONS 1,101,441  1/1968  Great Britain........................318/483

Primary Examiner—Benjamin Dobeck
Attorney—Cushman, Darby & Cushman

[57] ABSTRACT

An apparatus for automatically controlling the starting and stopping of a windshield wiper, the shifting of the wiper operation from a low speed operation to a high speed operation or vice versa, and the stopping of the wiper in a fixed resting position, which comprises a water drop detector having at least two electrodes mounted on the outer surface of the windshield with a small space interval therebetween, a control circuit for controlling the starting time or stopping time of the wiper operation in response to a signal obtained synchronously with the energization of said water drop detector caused by a drop of water attached thereto or a reciprocatory movement of the wiper blade, and a relay and an amplifier for actuating said relay.

10 Claims, 14 Drawing Figures

INVENTOR

Goro Inoue

BY Cushman, Darby & Cushman
ATTORNEYS

WINDSHIELD WIPER CONTROL APPARATUS

BACKGROUND OF THE INVENTION

1. Field of the Invention

The present invention relates to an apparatus for automatically controlling the starting and stopping of a windshield wiper, and more particularly relates to a control apparatus by which the windshield is automatically set in operation when it starts to rain and the operation of the windshield is automatically stopped when the rain has finished.

2. Description of the Prior Art

A conventional windshield wiper is so designed that it is set in operation by the driver when the field of vision of the driver through the windshield has come to be interfered with drops of water attached to the windshield, to wipe the windshield and the operation of the wiper is stopped by the driver when the rain has finished.

However, with such conventional windshield wiper as described above, the driver's action is required, every time it starts or stops raining requiring the shifting of a control which is not only cumbersome to the driver, but also undesirable from the standpoint of safe driving.

SUMMARY OF THE INVENTION

In order to eliminate the aforesaid disadvantages of the conventional windshield wiper, according to the present invention it is possible to provide an automatic windshield wiper which is operative in such a manner that it starts to wipe the windshield automatically when the field of vision of the driver has come to be interfered by drops of water attached to the windshield and stops its wiping operation automatically when the rain has finished, and which, therefore, will not bother the driver and is highly advantageous from the standpoint of safe driving.

An object of the present invention is to provide an apparatus for automatically controlling the operation of a windshield wiper in a satisfactory manner without requiring the driver's action, with which when the windshield of a vehicle becomes dim with drops of rain, impairing the driver's visibility through said windshield, the windshield wiper is set in operation automatically upon detecting such condition by means of a water drop detector, whereas when the rain has finished and the driver's visibility has sufficiently recovered, the operation of the wiper is stopped automatically and moreover when only a few water drops are attached to the windshield, the windshield wiper is held stationarily by means of a retaining mechanism without being started and stopped repeatedly.

As stated above, it is possible according to the present invention to start the wiper operation automatically when it starts raining, to stop the wiper operation automatically when it stops raining and to hold the wiper immovably when only a small amount of water is attached to the windshield and the field of vision of the driver is not so heavily interfered with by the water drops, the wiper being actuated only in such a condition that the field of vision is substantially impaired by drops of rain and the conductors of the water drop detector are shorted with each other by said drops of rain. Namely, the present invention achieves such a remarkable advantage that the wiper can be actuated automatically only when the driver really calls for the wiper operation. Another advantage of the invention is that when the rain has finished, the wiper is not stopped immediately, but the wiper operation is maintained until the water on the windshield has been cleared therefrom and the field of vision has completely recovered. Therefore, even when the presence of a water drop is not detected during one reciprocatory movement of the wiper blade just after the rain or in the case of drizzle the wiper blade continues its wiping operation if a drop of water is detected in the period of several reciprocatory movements of the same, without being stopped and started repeatedly, and hence does not give trouble to the driver. A further advantage of the invention is that the water drop detector is of such construction wherein two conductor plates are arranged on a disc which are electrically insulated from each other, with a slight space therebetween, and said disc is mounted on the drive shaft of a motor to be driven thereby, it is possible to determine the wiper operation starting time by the space interval between said conductor plates and the wiper operation termination time (i.e., the starting time of the operation of the retaining mechanism) by the r.p.m. of said motor, independently of each other. The wiper operation starting time may further be adjusted finely by the state of energization of a transistor which is changed by a variable resistor.

In addition to the advantages set forth above, it is also possible according to the present invention to operate the wiper at a low speed when the amount of rainfall is small and at a high speed when the amount of rainfall is large, automatically. Therefore, the driver is completely released from the responsibility of operating the wiper and this contributes greatly to safe driving.

Another object of the present invention is to provide an apparatus for automatically controlling the operation of a windshield wiper in a satisfactory manner without requiring the driver's action, which comprises a water drop detector adapted to be energized upon detecting a drop of water, a switch adapted to be opened and closed in synchronized relation to a reciprocatory movement of a wiper blade which is connected to a wiper arm and driven from a wiper arm driving motor through a link mechanism, a differentiation circuit electrically connected to said switch for producing a trigger pulse upon receipt of a signal from said switch, a monostable multivibrator operating in response to said trigger pulse, and an amplifier and a relay electrically connected to said water drop detector to be actuated thereby upon energization of the latter, the input voltage of said water drop detector being dropped to zero when said wiper blade has reached just a few inches short of its fixed resting position by the output of said monostable multivibrator, and said wiper arm driving motor being driven through said amplifier and said relay upon energization of said water drop detector and maintained in operation through said switch and said relay until said water drop detector is deenergized and immediately before said wiper blade reaches just a few inches short of its fixed position of rest, whereby when the field of vision of the driver comes to be interfered with by the drops of water attached to the windshield, the wiper is automatically set in motion without fail to wipe the drops of water from the windshield, whereas when the rain finishes, the operation of the wiper is automatically stopped and the wiper blade is set in its fixed position of rest.

As stated above, according to the present invention an apparatus for automatically controlling the operation of a windshield wiper can be obtained, by which the windshield wiping operation can be obtained when it starts raining and the field of vision of the driver has become impaired by the drops of water attached to the windshield, and the operation of the wiper is stopped when rain has finished and the wiper blade is set in its fixed position of rest, completely automatically without requiring any action on the part of the driver; and which, therefore, is highly advantageous from the standpoint of safe driving. It is also to be noted that according to the present invention the wiper blade is operated at a relatively large time interval when the amount of rainfall is relatively small and the time interval is progressively changed according to the increasing amount of rainfall until the wiper blade is operated continuously, and all such operations of the wiper blade can be obtained completely automatically. It is also an important feature of the present invention that by using the present invention it is possible to eliminate such an undesirable phenomenon that the wiper blade does not stop its operation, even after the rain has finished, as a result of the water drop detector being energized by the water retained on the wiper blade and spread over the windshield incident to the movement of said wiper blade.

DESCRIPTION OF THE PREFERRED EMBODIMENTS

The present invention will now be described by way of embodiments thereof with reference to the accompanying drawings.

Figure 1A:
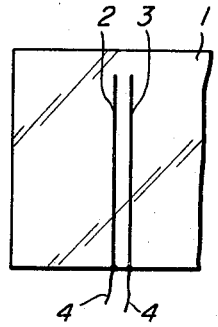
FIGS. 1a, 1b, 1c and 1d are fragmentary plan views of a windshield of a vehicle showing different types of a water drop detector used in the apparatus of the present invention respectively.
Figure 1C:
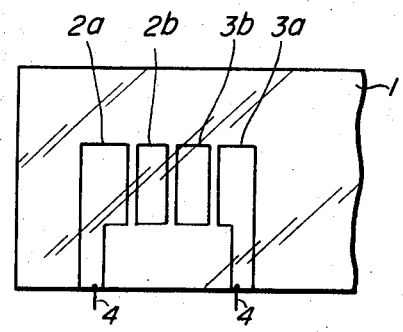
Figure 1B:
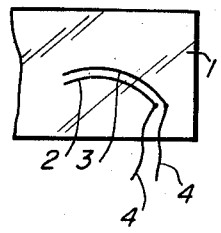

First of all, an embodiment of the invention will be described with reference to FIGS. 1a, 1b and 1c, and FIG. 3. FIG. 1a exemplifies the water drop detector used in the apparatus of the present invention. In FIG. 1a, reference numeral 1 designates a windshield to be wiped by a wiper blade, and 2 and 3 designate a pair of fine conductors attached to the windshield 1 and connected to conductors 4 at each end thereof respectively. Here, it should be noted that the fine conductors 2, 3 are provided at such a location that they will not interfere with the field of vision of the driver, within the range of sweep of the wiper blade in parallel relation to said wiper blade. The space interval between the conductors 2 and 3 is selected in such a manner that the conductors 2, 3 will be shorted to each other with a drop of rain but will not be shorted due to leakage under highly humid conditions. Preferably, the conductors 2, 3 are embedded in the windshield 1, with a portion of the peripheral surface thereof only exposed to the outside for engagement with the wiping surface of the wiper blade. Where the conductors 2, 3 are not to be embedded in the windshield 1, they are made small in diameter or thickness so as not to constitute a hazard to the wiper blade operation. Alternatively, the conductors 2, 3 may be provided at the lower portion of the windshield 1 in perpendicular relation to said windshield (or circumferentially of a circle concentric with the center of the sweeping motion of the wiper) as shown in FIG. 1b, and in this way the field of vision of the driver will be less interfered by the conductors. Although in FIGS. 1a and 1b use is made of two fine conductors 2, 3 as electrodes of the water drop detector, a pair of thin sheets of transparent conductor films 2a, 3a may be used as the electrodes as shown in FIG. 1c. It is also possible to interpose other conductor films 2b, 3b between the conductor films 2a, 3a so that a wiper operation starting signal may be issued only after drops of rain are attached to all of the three spaces defined by said conductor films 2a, 2b, 3b and 3a, and a wiper operation stopping signal may be issued when the drops of rain are cleared from any one of said three spaces.

Figure 3:
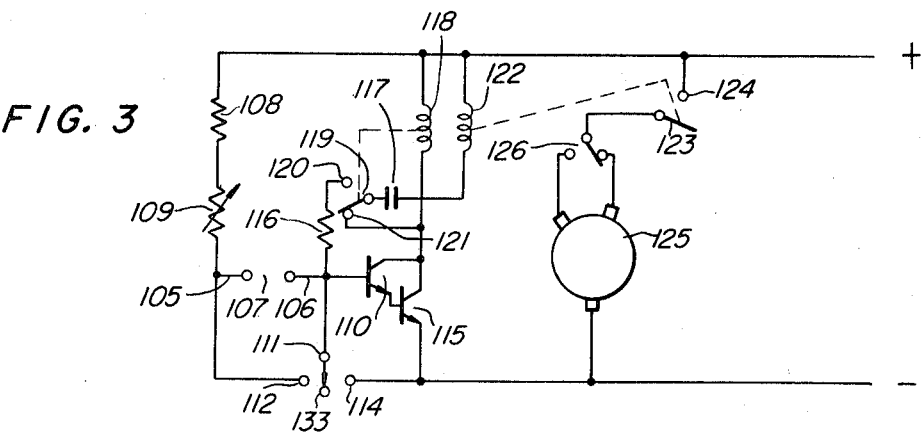
FIG. 3 is a circuit diagram of an electric control system of the apparatus of the present invention, incorporating the water drop detector of the type shown in FIG. 1a, 1b and 1c.

Referring to FIG. 3, there is shown an electric circuit diagram of the embodiment of the present invention described above. In FIG. 3, reference numerals 105 and 106 designate conductors connected with the aforesaid conductors 4 respectively, 107 an electrically insulated portion constituted by the gap between the fine conductors 2, 3 shown in FIGS. 1a and 1b or a plurality of gaps formed by the conductor films 2a, 2b, 3b, 3a shown in FIG. 1c, and 108 and 109 resistors of which the resistor 109 is a variable resistor for adjusting the base current of a transistor 110. Reference numeral 111 designates a manual changeover switch having three fixed contacts 112, 113 and 114; 115 a transistor which is energized by the transistor 110, the two transistors operating as an amplifier in a Darlington connection; and 116 a resistor which forms a time-limit circuit together with a capacitor 117. Reference numeral 118 designates a relay coil, 119 a movable contact, 120 a normally open fixed contact, 121 a normally closed fixed contact, 122 another relay coil, 123 a movable contact and 124 a normally open fixed contact. Reference numeral 125 designates a wiper driving motor and 126 designates a switch by which said motor 125 is shifted from a low speed circuit to a high speed circuit or vice versa.

The wiper control apparatus constructed as described above operates in the following manner: Namely, when the manual changeover switch 111 is set in the position of the fixed contact 112, a positive potential is imposed on the base of the transistor 110 through the resistors 108, 109 and said changeover switch 111, with a current flowing through the base of said transistor. Thus, the transistor 110 is energized and accordingly the transistor 115 connected thereto is also energized. A current flows through the relay coils 118, 122 which are connected to the collectors of the transistors 110, 115 respectively, with the result that the relay coil 118 attracts the movable contact 119 and connects the same with the normally open fixed contact 120. Therefore, the capacitor 117 which has been in the discharged state is charged through the resistor 116. On the other hand, the relay coil 122 attracts the movable contact 123 and connects it with the normally open contact 124, so that the motor 125 is set in motion and the wiper starts to wipe the surface of the windshield. Now, when the manual changeover switch 111 is shifted to the position of the fixed contact 114, supply of the base current to the transistor 110 through the resistors 108, 109 is interrupted and the base potential of said transistor becomes negative, so that the transistors 110, 115 are deenergized at once, interrupting the current supply to the relay coils 118, 122. The movable contacts 119, 123 are returned to their original positions respectively. Namely the movable contact 119 is brought into contact with the normally closed fixed contact 121, whilst the movable contact 123 is disengaged from the normally open fixed contact 124. Consequently, the motor 125 stops running and the electricity stored in the capacitor is discharged through the contacts 119, 121. Thus, the wiper stops its operation. In other words, with the control apparatus described above, the wiper can be set in operation or stopped by operating the manual changeover switch 111 as with the conventional apparatus. It is also possible, by operating switch 126, to shift motor 125 from a low speed rotation to a high speed rotation or vice versa to change the operating speed of the wiper, according to the intensity of the rain.

By shifting the manual changeover switch from the position of the fixed contact 112 to the position of the fixed contact 114 or vice versa, starting or stopping of the wiper can be effected as has been heretofore. Next, when the manual changeover switch 111 is set in the position of the intermediate fixed contact 113, the motor 125 is not set in motion and, therefore, the wiper is held inoperative, since the base of transistor 110 is disconnected from the power source. However, when electrical connection is established between the conductors 2 and 3 or between the conductor films 2a and 3a of the water drop detector through a drop of rain, the electrically insulated portion 107 is shorted, so that a current flows to the base of the transistor 110 through the resistors 108, 109 and the electrically insulated portion 107 of the water drop detector which is now shorted. Namely, establishment of electrical connection at the electrically insulated portion 107 brings about the same circuit condition as when the manual changeover switch 111 is set in the position of the fixed contact 112, so that the motor 125 is set in motion and the wiper starts its wiping operation. When the rain ceases and drops of rain disappear from the water drop detector, breaking the electrical connection at the electrically insulated portion 107, the current supply to the base of the transistor 110 through the resistors 108, 109 is interrupted. However, the base of the transistor 110 is supplied with a current discharged from the capacitor 117 through the resistor 116, owing to the retaining mechanism composed of the resistor 116, the capacitor 117, the relay coil 118 and the contacts 119, 120, and thus the transistors 110 and 115 are maintained in the energized state. Therefore, the motor 125 continues its rotation and accordingly the wiper continues its operation. Then, the charge stored in the capacitor 117 is exhausted, whereupon the transistors 110 and 115 are deenergized and the current supply to the relay coils 118, 122 is interrupted. The movable contact 119 is brought into contact with the normally closed fixed contact 121, whilst the movable contact 123 is disengaged from the normally open fixed contact 124, whereby the motor 125 stops running and the wiper stops its operation. Thus the wiper continues its operation for a while even after the rain has stopped. Therefore, if drops of rain attach again on the water drop detector during this period, the wiper continues its operation. Because of such a construction, the wiper operation will not be interrupted repeatedly under conditions of intermittent drizzle and will not cause trouble to the driver. When a drop of rain is no longer attached to the water drop detector, the wiper stops its operation after continuing its operation for a while from the time when the drops of water are cleared therefrom. Here, it should be noted that the resistance value of the resistor 109 is adjustable for conformance to a desired degree of electrical shorting at the electrically insulated portion 107. By adjusting the resistance value of the resistor 109, it is possible to start the wiper operation when the water drop detector has become electrically conductive only slightly or to start the wiper operation only after said water drop detector has become extremely conductive.

Figure 2A:
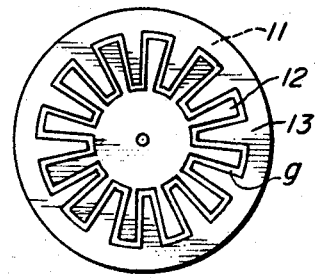
FIG. 2a is a plan view of still another type of the water drop detector used in the apparatus of the present invention.
Figure 2B:
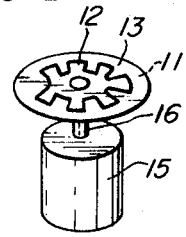
FIG. 2b is a perspective view showing the water drop detector of FIG. 2 connected to a driving motor.
Figure 4:
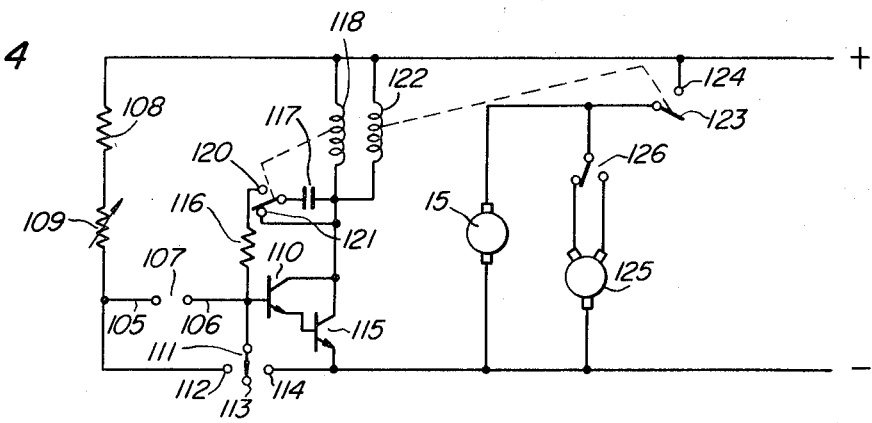
FIG. 4 is a circuit diagram of an electric control system of the apparatus of this invention, incorporating the water drop detector of the type shown in FIGS. 2a and 2b.

FIG. 2a shows another type of the water drop detector used in another embodiment of the present invention. In FIG. 2a, reference numeral 11 designates a disc of an electrical insulating material, which comprises two conductor plates 12, 13 arranged with radially outwardly extending projections of the former received in corresponding gaps between radially inwardly extending projections of the latter so as to define a narrow zigzag space g therebetween. The interval of the space is selected to be so small that an electrical connection may be established between the conductor plates 12, 13 when a drop of water is attached to the space. Namely, the space interval is generally on the order of 0.2 to 2 mm., preferably of the order of 1 mm. The disc 11 of the structure described above is connected to the drive shaft 16 (FIG. 2b) of a motor 15 to be driven thereby. The conductor plates 12, 13 are respectively connected to conductors not shown, which are in turn connected to an external circuit through a slip ring and a brush mechanism. The disc 11 is positioned at a location which will be wetted to the same extent as the windshield, e.g. at the lower portion of a side edge of the windshield. An electric circuit comprising the water drop detector of the type described above is shown in FIG. 4. In FIG. 4, same numerals as those used in FIG. 3 show same or equivalent parts, so that an explanation of the electric circuit is omitted. The only difference between the circuit of FIG. 3 and that of FIG. 4 is that the motor 15 for driving the unique type of the water drop detector shown in FIG. 2b is connected to the power source for the wiper driving motor 125 in parallel relation to said wiper driving motor, so that both motors may be started and stopped simultaneously. With the unique type of water drop detector, it is possible to determine the wiper operation starting time by the space interval between the conductor plates and to determine the wiper operation termination time (or the retaining mechanism operating time) by the r.p.m. of the motor independently of the wiper operation starting time, and further by adjusting the resistance value of the variable resistor 109, it is possible to adjust the wiper operation starting time continuously finely as is in case of the circuit shown in FIG. 3.

Figure 5:
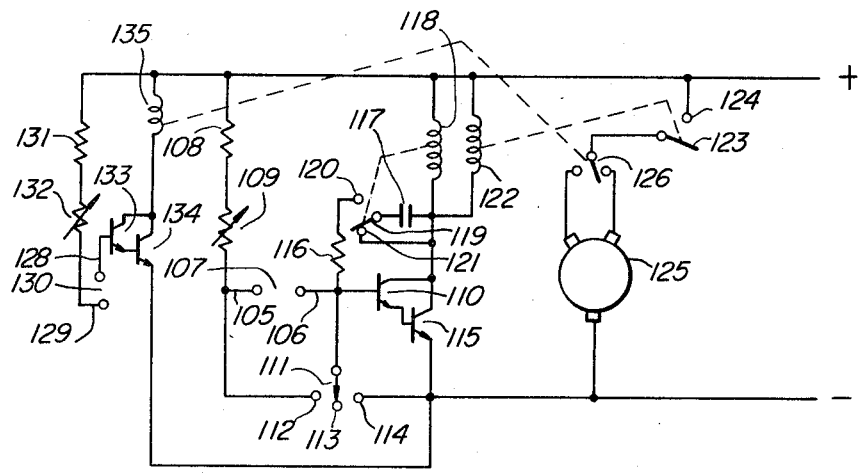
FIG. 5 is a circuit diagram of an electric control system of the apparatus of the present invention, incorporating the water drop detector of the type shown in FIG. 1d.

Still another embodiment of the present invention will be described hereunder with reference to FIGS. 1d and 5: FIG. 1d shows still another type of the water drop detector used in the present invention. According to this type, a fine conductor 5 is mounted in addition to a pair of fine conductors 2, 3 in such a manner that the space interval between the conductors 5 and 2 is larger than the space interval between the conductors 2 and 3. Conductors 4 connected to the conductors 2, 3 respectively are connected to conductors 105, 106 shown in the circuit diagram of FIG. 5 respectively, whilst the conductor 4 connected to the conductor 2 and a conductor 4a connected the conductor 5 are connected to conductors 129 and 128, shown in the circuit diagram of FIG. 5, respectively. FIG. 5 shows an electric circuit of the wiper control apparatus comprising the above-described water drop detector and in which same numerals as those used in FIG. 3 indicate same or equivalent parts and will not be described again. Reference numeral 130 designates an electrically insulated portion constituted by the space between the conductors 2 and 5 shown in FIG. 1d, 131 and 132 resistors, 133 and 134 transistors, and 135 a relay coil provided for operating a switch 126 by which the motor 125 is shifted from a low speed circuit to a high speed circuit or vice versa. Namely, the relay coil 135 and the switch 126 together form one relay.

With the above-described arrangement, when the conductors 2, 3 of the water drop detector are shorted with each other by a drop of rain and an electrical connection is established at the electrically insulated portion 107, the motor 125 is driven at a low speed to cause the wiper to wipe the surface of the windshield at a low speed. As the rain becomes heavier, the conductors 2 and 5 are also electrically shorted by the drops of rain, establishing an electrical connection at the electrically insulated portion 130. As a result, the transistors 133, 134 are energized, with a current flowing through the relay coil 135. The relay coil 135 thus energized attracts the movable contact of the switch 126 to bring it into contact with another fixed contact and thus the motor 125 is shifted to a high rotation. Thus, by providing the conductor 5 to form a space between it and the conductor 2 which is wider than the space between the conductors 2 and 3, it is possible to detect an increasing amount of rain and thereby to shift the operating speed of the wiper from a low speed to a higher speed automatically. In FIG. 5, the resistors 131, 132 are provided to determine the base current of the transistor 133, and the base current of said transistor is adjusted by the variable resistor 132 so that the operation of the motor 125 may be shifted to or from the high speed operation at a desired amount of rainfall.

Figure 1E:
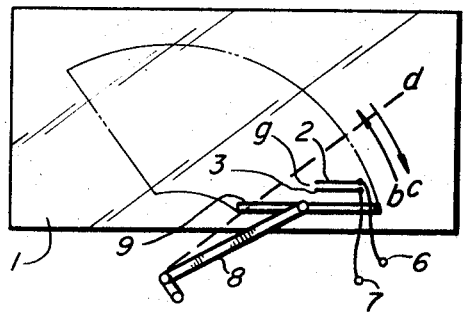
FIG. 1e is a plan view of a windshield of vehicle showing the water drop detector, together with a wiper arm and a wiper blade.
Figure 1D:
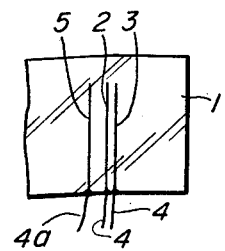
Figure 6:
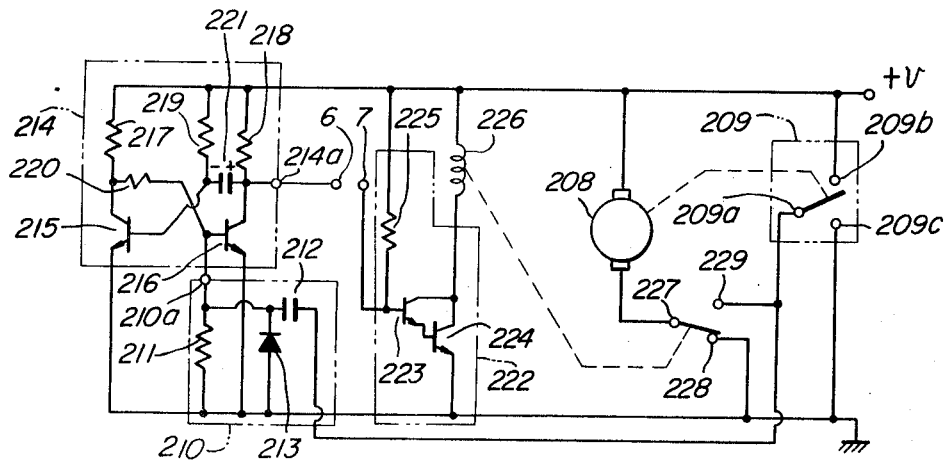
FIG. 6 is a circuit diagram of an electric control system of the apparatus of the present invention, incorporating the water drop detector of the construction and arrangement shown in FIG. 1e.
Figure 7A:
FIGS. 7a, 7b and 7c are diagrams showing the voltage wave forms at various portions of the electric control system, shown in FIG. 6, of the apparatus of this invention respectively.
Figure 7B:
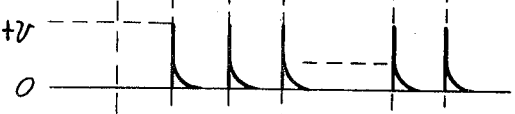
Figure 7C:
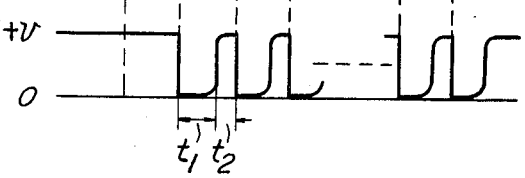

Still another embodiment of the present invention is shown in FIGS. 1e, 6, 7a, 7b and 7c. Referring to FIGS. 1e and 6, reference numeral 1 designates a windshield of a vehicle and 8 designates a wiper arm constituting a follower link of a link mechanism. Reference numeral 9 designates a wiper blade pivotably connected to the forward end of the wiper arm 8 and having a rubber strip firmly attached thereto by which the surface of the windshield is wiped. Reference numerals 2 and 3 designate barlike conductors which constitute a water drop detector and which are mounted in parallel relation in the outer surface of the windshield 1 within the range of sweep of the wiper blade 9, at such a location as will not interfere with the field of vision of the driver. The space interval between the conductors 2 and 3 is so selected that said conductors 2, 3 may be shorted with each other by a drop of rain attached in a space g between said conductors. Reference numerals 6 and 7 designate lead terminals of the conductors 2, 3 respectively;

208 in FIG. 6 designates a wiper arm driving motor by which the link mechanism including the wiper arm 8 is operated; and 209 a switch. A movable contact 209a of the switch 209 is operated by a cam, not show, and brought into contact with a fixed contact 209b at the position indicated by dotted line d immediately before the wiper blade 9 reaches its resting position (the position shown in FIG. 1e) and retained until the wiper moves again from its resting position, but is held in contact with another fixed contact 209c for the other position of the wiper blade 9, said cam being rotated in synchronized relation to the wiper arm driving motor 208. It will, therefore, be appreciated that a one positive voltage in every one reciprocatory movement signal (FIG. 7a), synchronous with the reciprocatory movement of the wiper blade 9, can be obtained from the movable contact 209a of the switch 209. Reference numeral 210 designates a differentiation circuit composed of a resistor 211, a capacitor 212 and a diode 213. This differentiation circuit 210 serves to differentiate the rectangular pulse signal drawn from the movable contact 209a of the switch 209 and thereby to obtain a trigger pulse (FIG. 7b). Reference numeral 214 designates a monostable multivibrator composed of transistors 215, 216, resistors 217, 218, 219, 220, and a capacitor 221, and designed to be inverted upon receipt of the positive trigger pulse from the differentiation circuit 210 at the base of the transistor 216. An amplification circuit 222 is composed of two transistors 223, 224 having a Darlington connection and a base resistor 225. An exciting coil 226 is connected to the collectors of the transistors 223, 224. Reference numeral 227 designates a movable contact operated by the exciting coil 226. This movable contact 227 is held in contact with a fixed contact 228 in the energized state of the exciting coil 226 and with a fixed contact 229 in the deenergized state of said exciting coil. The exciting coil 226, the movable contact 227 and the fixed contacts 228, 229 compose a relay. The terminals 6, 7 of the conductors 2, 3, shown in FIG. 1e, are the same as the terminals 6, 7 shown in FIG. 6. FIGS. 7a, 7b and 7c show voltage wave forms at various portions of the circuit, in which FIG. 7a shows the wave from of the positive voltage produced at the movable contact 209a of the switch 209; FIG. 7b shows the wave form of the trigger pulse produced at the output terminal 210a of the differentiation circuit 210; and FIG. 7c shows the wave form of a pulse signal produced at the output terminal 214a of the monostable multivibrator 214 (or the collector of the transistor 216).

Now, the operation of the FIGS. 1e and 6 apparatus constructed as described above will be explained hereunder: When the conductors 2, 3 mounted in the windshield 1 are shorted with each other by a drop of rain attached to the space g between said conductors, a current from a power source flowing through the resistor 218, the terminal 6, the conductor 2, the drop of rain in the space g, the conductor 3 and the terminal 7 is joined with a current flowing through the resistor 225, and the resultant current flows to the base of the transistor 223, whereby said transistor 223 and the transistor 224 are energized. As a result, the exciting coil 226 is energized by a current from the transistors 223, 224 and the movable contact 227 is moved into contact with the fixed contact 228 under the influence of said exciting coil 226. The motor 208 is set in motion by a current supplied to the armature thereof through the movable contact 227 and the fixed contact 228. Upon actuation of the motor 208, the wiper blade 9 is caused to begin a movement in the direction of arrow b in FIG. 1e from its rest position through the link mechanism, including the wiper arm 8, operated by said motor 208 and thus wiper the windshield 1. On the other hand when the wiper blade returns in the direction of arrow c, the movable contact 209a of the switch 209 is operated at the position d by the cam, not shown, which is driven in synchronized relation to the motor 208. Therefore, a positive voltage is applied to the movable contact 209a, synchronously with the rotation starting time $t_0$ of the motor 208, as a result of the positive voltage +v being interrupted repeatedly once on each reciprocation of the wiper blade 9 as shown in FIG. 7a. The positive voltage +u is converted into a positive trigger pulse through the differentiation circuit 210 and the resultant positive trigger pulse is impressed on the base of the transistor 216 in the monostable multivibrator 214. The transistor 216 which has been in the deenergized state, is energized and the collector voltage of said transistor drops to substantially zero. Thus, it will be seen that when the positive voltage +u is generated at the movable contact 209a of the switch 209, the input voltage of the water drop detector is interrupted even if the conductors 2, 3 of said detector are shorted with each other by a drop of water existing in the space g between said conductors, and the movable contact 227 returns to the fixed contact 229 position resulting in a cut off of the energization of the motor 208. In more detail the duration $t_1$ of energization of the transistor 216 in the monostable multivibrator 214 (the period in which the output voltage of the monostable multivibrator 214 is substantially zero), as shown in FIG. 7c, is determined by the time constants of the resistor 219 and the capacitor 221, and the transistor 215 is energized and the transistor 216 is deenergized when the terminal voltage of the capacitor 221 exceeds the cutoff base voltage $V_{be}$ of said transistor 215. The transistor 216 is held deenergized for a period $t_2$ until it is impressed with the next trigger pulse from the differentiation circuit 210 (the period in which the output voltage of the monostable multivibrator 214 is v volts).

The rotation of the cam by which the movable contact 209a of the switch 209 is operated is synchronized with the reciprocatory movement of the wiper blade 9 in such a manner that said movable contact 209a is brought into contact with the fixed contact 209b at the position d and just this side the water drop detector before said wiper blade 9 reaches its position of rest during its stroke in the direction of arrow c shown in FIG. 1e. Therefore, when the transistor 216 in the monostable multivibrator 214 is triggered by the trigger pulse obtained upon conversion of the positive voltage +u, produced at the movable contact 209a, through the differentiation circuit 210, the input voltage of the water drop detector becomes zero immediately after the wiper blade 9 has been reached at the position d just a few inches short of its position of rest. Namely, the input voltage of the water drop detector is controlled by the output voltage of the monostable multivibrator 214. In explaining this with reference to FIG. 7c, the input voltage to the water drop detector is present in the period of $t_2$ and not present in the period of $t_1$. After the wiper blade has passed the position d, it moves to its rest position with the force of inertia during the period of $t_1$.

Thus, when the rain falls constantly since heavily, and the conductors 2, 3 are shorted with each other by the drops of rain attached in the space g, the transistors 223, 224 are energized, supplying a current to the exciting coil 226 to energize the same. As a result, the movable contact 227 is shifted to be incontact with the fixed contact 228 and thus the motor 208 is set in motion, so that the wiper blade 9 is operated to move instantly in the directions of arrow b, wiping the windshield 1. On the other hand, even when said conductors 2, 3 are electrically insulated from each other, the transistors 223, 224 are deenergized and the exciting coil 226 is deenergized accordingly, so that the movable contact 227 is shifted and held in contact with the fixed contact 229, since the movable contact 209a of the switch 209 is held in contact with the fixed contact 209c up to a time immediately before the wiper blade 9, sliding in the direction of arrow c, reaches at the position d just this side its resting position, the motor 208 continues to rotate by receiving the armature current through the movable contact 227, the fixed contact 229, the movable contact 209a and the fixed contact 209c. Even in such a case, when the drops of water in the space g between the conductors 2 and 3 is removed by the sliding movement of the wiper blade 9 in the direction of arrow c, whereby the electrical connection between said conductors is broken, but the electrical connection is resumed immediately thereafter in the period after the wiper blade has passed the conductors 2 and 3 and reaches its rest position, by a large amount of rain water, so that the transistors 223, 224 are energized again after the period $t_1$ from the movable contact 209a engages with the fixed contact 209b and hence the relay coil 226 is energized engaging the movable contactor 227 with the fixed contactor 228. Therefore, the wiper blade 9 moves in the direction of arrow b without stopping at its rest position.

When the rain finishes and visibility is recovered in the process of the above-described wiping operation of the wiper blade 9, the wiping operation is no longer required but continuous operation of the wiper blade is rather annoying to the driver. Therefore, it is necessary to stop the wiper operation at the same time when the rain finishes. According to the present invention, it is possible to automatically stop the wiper operation when it stops raining and yet further to bring the wiper blade to its position of rest. Namely, the transistors 223, 224 are deenergized and the current supply to the relay coil 226 is interrupted. Consequently, the relay coil 226 is also deenergized and the movable contact 227 engages the fixed contact 229. Since the movable contact 209a and the fixed contact 209c of the switch 209 are in engagement with each other in this case, the motor 208 continues to rotate, causing the wiper blade 9 to slide towards the position d just this side its position of rest. When the wiper blade 9 has reached the position d just this side its position of rest, the movable contact 209a of the switch 209 engages the fixed contact 209b to interrupt the current supply to the motor 208, so that the said motor 208 stops rotating. Thus, the wiper blade 9 is automatically stopped in its position of rest.

Furthermore, if the rain stops raining during the wiping operation, the wiper blade wipes out the water drop on the space g between the conductors 2 and 3 when it moves sliding over the conductors in the direction of arrow c, and at the same time breaks the electric connection between the conductors 2 and 3 causing the wiper blade to stop at its rest position. If the conductors 2 and 3 were not positioned within the wiping range of the wiper blade, difficulties are encountered in that, even after the rain has stopped, due to the electrical connection being maintained between the conductors 2 and 3 of the water drop detector by a water drop remained over the space g between said conductors without being moved and produces the same condition as it is raining and the wiper operation is not stopped until the water drop has evaporated. However, in this invention since the conductors 2 and 3 are positioned within the wiping range of the wiper blade, those difficulties are eliminated.

As may be understood from the foregoing description, with the control apparatus of this invention the wiper is automatically operated for wiping the windshield 1 at a certain time interval under conditions of drizzle since the wiper blade does not start movement until the conductors 2 and 3 become conductive again and said time interval is automatically shortened as the amount of rainfall increases in proportion to the rate of increase, until finally said wiper is operated continuously.

Although in the embodiments described herein use was made of a water drop detector which is composed of a pair of barlike conductors 2, 3, arranged in parallel opposed relation so as to form the space g therebetween, it is also possible to use a water drop detector of the type shown in FIG. 1c which has a plurality of spaces g so that said detector may be actuated only when drops of rain have been attached onto all of said spaces g, or a water drop detector of the type shown in FIG. 2a which comprises two conductor plates arranged on a disc in electrically insulated relation to each other, with a suitable space therebetween.

What is claimed is:

1. An apparatus for controlling a windshield wiper and its drive motor connected in a power source circuit, comprising
a water drop detector having at least two electrodes adapted to be mounted on the outer surface of a windshield with a small space interval therebetween,
an amplifier electrically connected to said water drop detector which operates said amplifier upon energization of said water drop detector,
said amplifier being provided with a retaining mechanism including time-limiting means for establishing a predetermined time period, and
a switch device operated by said amplifier to close said power source circuit of said wiper-driving motor upon said energization of the water drop detector and also to actuate said retaining mechanism so that when said water drop detector has been returned to the deenergized state the amplifier is enabled by said time-limiting means to continue its operation of retaining said power circuit closed by said switch device for only said predetermined time period as established by said time-limiting means,
wherein said water drop detector comprises a rotary disc and two conductor plates arranged on said rotary disc in electrically insulated relation to each other with a slight space interval therebetween, said rotary disc being mounted on the drive shaft of another motor which is started and stopped by said switch device concurrently with said wiper driving motor.

2. An apparatus for controlling a windshield wiper and its drive motor connected in a power source circuit, comprising
a water drop detector having at least two electrodes adapted to be mounted on the outer surface of a windshield with a small space interval therebetween,
an amplifier electrically connected to said water drop detector which operates said amplifier upon energization of said water drop detector,
said amplifier being provided with a retaining mechanism including time-limiting means for establishing a predetermined time period, and
a switch device operated by said amplifier to close said power source circuit of said wiper-driving motor upon said energization of the water drop detector and also to actuate said retaining mechanism so that when said water drop detector has been returned to the deenergized state the amplifier is enabled by said time-limiting means to continue its operation of retaining said power circuit closed by said switch device for only said predetermined time period as established by said time-limiting means,
wherein said water drop detector has three or more electrodes mounted on the outer surface of a windshield at two different space intervals between each other so as to define a narrow space or spaces and a slightly wider space or spaces,
and said amplifier includes a first amplifier for actuating the switch device upon energization of those electrodes of said water drop detector which define the narrow space and a second amplifier for actuating the switch device upon energization of those electrodes of said water drop detector which define the wider space,
said switch device being actuated by said first amplifier serving to open and close the power source circuit of the wiper-driving motor and also to actuate said retaining mechanism when said electrodes defining the narrow space have been returned to the deenergized state so as force said first amplifier to continue its operation,
said switch device being actuated by said second amplifier serving to shift said wiper-driving motor from a low speed circuit to a high speed circuit or vice versa.

3. An apparatus for automatically controlling a windshield wiper, comprising a water drop detector adapted to be energized upon detecting a drop of water, a switch adapted to be opened and closed in synchronized relation to a reciprocatory movement of a wiper blade which is connected to a wiper arm and driven from a wiper-arm-driving motor through a link mechanism, a differentiation circuit electrically connected to said switch for producing a trigger pulse upon receipt of a signal from said switch, a monostable multivibrator operating in response to said trigger pulse, and an amplifier and a switch device electrically connected to said water drop detector to be actuated thereby upon energization of the latter, the input voltage of said water drop detector being dropped to zero only immediately after said wiper blade has been set in its fixed position of rest by the output of said monostable multivibrator, and said wiper-arm-driving motor being driven through said amplifier and said switch device upon energization of said water drop detector and maintained in operation through said switch and said relay until said water drop detector is deenergized and immediately before said wiper blade reaches its fixed position of rest.

4. An apparatus for controlling a windshield wiper and its drive motor connected in a power source circuit, comprising
a water drop detector having at least two electrodes adapted to be mounted on the outer surface of a windshield with a small space interval therebetween,
an amplifier electrically connected to said water drop detector which operates said amplifier upon energization of said water drop detector,
said amplifier being provided with a retaining mechanism including time-limiting means for establishing a predetermined time period, and
a switch device operated by said amplifier to close said power source circuit of said wiper-driving motor upon said energization of the water drop detector and also to actuate said retaining mechanism so that when said water drop detector has been returned to the deenergized state the amplifier is enabled by said time-limiting means to continue its operation of retaining said power circuit closed by said switch device for only said predetermined time period as established by said time-limiting means,
wherein said time-limiting means includes an resistance capacitance circuit and means to cause charging of said capacitance upon the said energization of said detector and discharging thereof up deenergization of said detector, said discharging being effective to keep said amplifier operative for said predetermined time period.

5. Apparatus as in claim 4 in combination with said drive motor and connected power source circuit.

6. Apparatus for automatically controlling a drive motor connected in a power source circuit for driving a window wiper for a windshield or the like in response to water shorting at least two spaced electrodes of a water drop detector, comprising:
an amplifier having means for connection to said detector for causing amplifier operation during the shorting of said electrodes,
timing means operated by said amplifier for automatically keeping said amplifier operating for a predetermined time period after said electrodes become unshorted, and
switch means operated by said amplifier for closing said power source circuit to said drive motor only while said amplifier is operating,
wherein said amplifier includes at least one transistor having input bias and output circuits, said timing means including resistance and capacitance connected between said input and output circuits and having means for changing the charge on said condenser in one direction during operation of said amplifier for supplying bias to said transistor for said time period upon cessation of the shorting of said electrodes.

7. Apparatus for automatically controlling a drive motor connected in a power source circuit for driving a window wiper for a windshield or the like in response to water shorting at least two spaced electrodes of a water drop detector, comprising:
an amplifier having means for connection to said detector for causing amplifier operation during the shorting of said electrodes,
timing means operated by said amplifier for automatically keeping said amplifier operating for a predetermined time period after said electrodes become unshorted, and
switch means operated by said amplifier for closing said power source circuit to said drive motor only while said amplifier is operating,
said apparatus being for use with a water drop detector which has at least a third electrode spaced from an adjacent one of said two electrodes a different interval than the interval between said two electrodes and for use with a said drive motor of the type having at least two speeds, wherein said apparatus further includes,
a second amplifier having means for connection to said third and adjacent electrodes for operating said second amplifier when said third and adjacent electrodes are shorted, and
means for switching said drive motor from one of said two speeds to the other only while said second amplifier is operated as aforesaid.

8. Apparatus for automatically controlling a drive motor connected in a power source circuit for driving a window wiper for a windshield or the like in response to water shorting at least two spaced electrodes of a water drop detector, comprising:
an amplifier having means for connection to said detector for causing amplifier operation during the shorting of said electrodes,
timing means operated by said amplifier for automatically keeping said amplifier operating for a predetermined time period after said electrodes become unshorted, and
switch means operated by said amplifier for closing said power source circuit to said drive motor only while said amplifier is operating,
said apparatus further including
a three position manual switch having an on position, automatic position, and off position,
means for connecting said switch in its on position to said power source circuit and amplifier to operate said switch means and motor non-automatically regardless of the presence or absence of water shorting said electrodes,
said switch in its automatic position being disconnected from said power source to permit the aforesaid automatic operation of said amplifier, and
means connected to said switch and operative upon movement of said switch to said off position for turning off said amplifier and open said power source circuit immediately even if said time period has yet not expired.

9. Apparatus for automatically controlling a drive motor to effect reciprocation from and to a fixed position of rest of a window wiper blade for a windshield or the like in response to water shorting at least two spaced electrodes of a water drop detector, comprising:
means including a two position switch for producing a trigger pulse while said switch is in one of said positions only during each time said blade approaches said rest position,
a monostable multivibrator having an output and stable and unstable states for respectively producing at said output off and on output signals and being responsive to said trigger pulse to change to said unstable state for a first predetermined period of time to produce said off output signal following which it automatically reverts to said stable state to produce said on output signal for a second time period which ends upon receipt of the next trigger pulse,
actuable switch means having an input and being connected to said switch for operating said drive motor while said switch means is turned on and also while it is turned off if said switch is then in the other of said two positions, and
means for connecting said electrodes respectively to said multivibrator output and said actuable switch means input for applying said multivibrator on and off output signals to said switch means to turn the same on and off only while said electrodes are shorted.

10. Apparatus as in claim 9 wherein said second time period has a duration of from about one-third to about two-thirds of the sum of the durations of said first and second time periods.

* * * * *